United States Patent [19]

Maccabee

[11] 3,714,440

[45] Jan. 30, 1973

[54] SIMPLE, SELF-PROTECTED PHOTOELECTRIC EYE CIRCUITRY

[76] Inventor: Bruce Sargent Maccabee, 10706 Meadowhill Road, Silver Spring, Md. 20907

[22] Filed: June 30, 1971

[21] Appl. No.: 158,456

[52] U.S. Cl.................................250/206 R, 250/214
[51] Int. Cl..............................................G01j
[58] Field of Search......250/206, 209, 214, 221, 222; 307/311; 315/149

[56] References Cited

UNITED STATES PATENTS

| | | | |
|---|---|---|---|
| 3,026,498 | 3/1962 | Galliers | 250/214 |
| 3,330,959 | 7/1967 | Willardson | 250/214 |
| 3,361,931 | 1/1968 | Vollrath | 250/206 |
| 3,443,106 | 5/1969 | Ebershoft | 250/214 |
| 3,475,676 | 10/1969 | Hutson | 250/214 |
| 3,562,534 | 2/1971 | Jarrett | 250/214 |

*Primary Examiner*—James W. Lawrence
*Assistant Examiner*—D. C. Nelms

[57] ABSTRACT

A simple photoelectric control circuit that operates when a light beam is interrupted is described. The circuit can operate electromagnetic or thermal relay switches. The circuit is arranged so that the relay will not be energized if the source of the light beam should fail.

1 Claim, 1 Drawing Figure

PATENTED JAN 30 1973                                   3,714,440
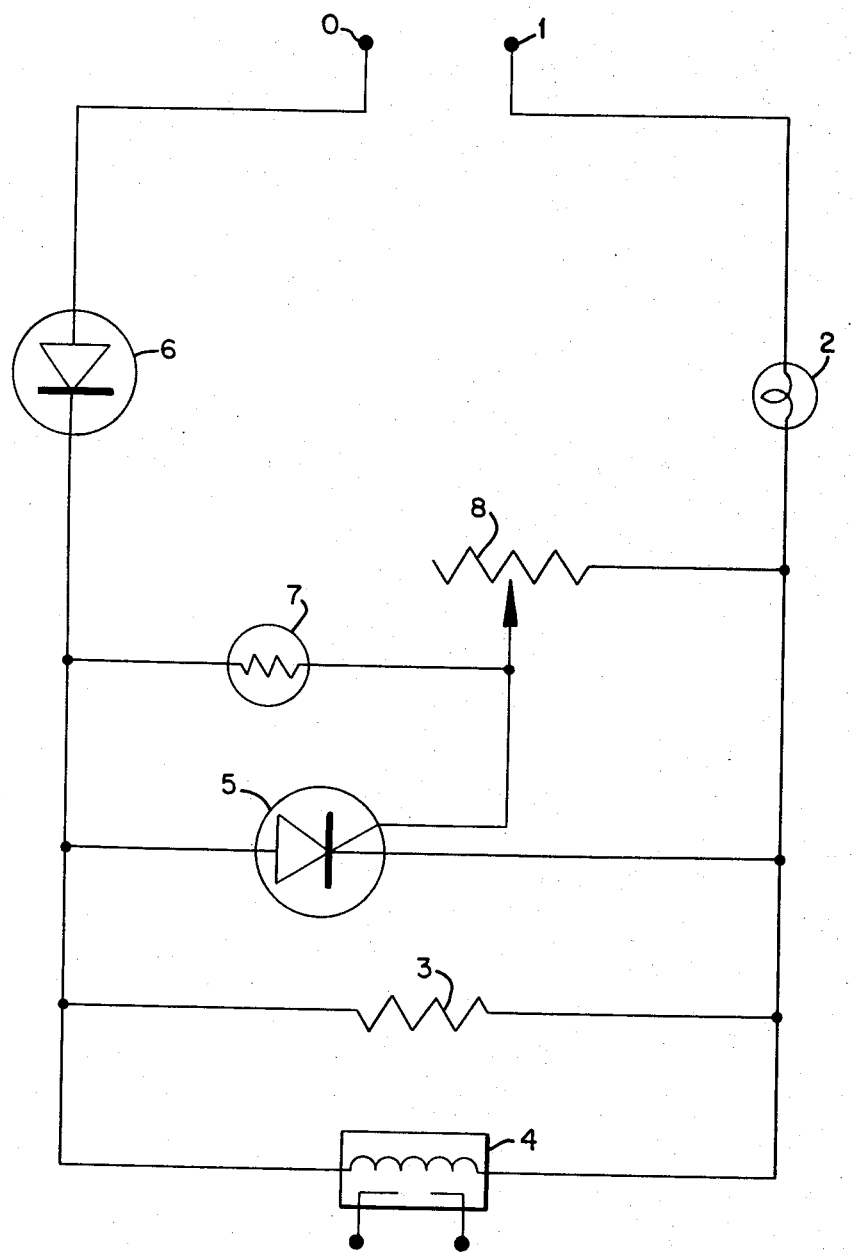

SIMPLE, SELF-PROTECTED PHOTOELECTRIC EYE CIRCUITRY

This invention relates to photoelectric control circuits, and more particularly, to very simple photoelectric circuits of the type which operate electromagnetic and/or thermal relay switches when a light beam is interrupted. For the purposes of this specification, the term "light beam" shall refer to any continuous path of electromagnetic radiation, visible to the human eye or not, which travels from the radiation source to the radiation sensor, and the interruption of which causes the circuit to energize a relay or relays.

One main object of this invention is to provide a simple photoelectric circuit for device control applications in which cost and reliability are important considerations, by utilizing the minimum possible number of components necessary to create a satisfactory circuit with useable sensitivity. Another important object is to create a simple photoelectric control circuit which is self-protected in the sense that it will not operate the controlled device if the light bean source fails. Still another object of the invention is to create a simple photoelectric circuit that will provide a satisfactory photoelectric control function with a wide variety of electromagnetic and/or thermal relays. Still another object of the invention is to provide a simple photoelectric circuit which can be easily and instantaneously checked for circuit operation and can be easily and instantaneously checked for light beam alignment and in which each of the previous checks may be made using only the light beam source as a test "instrument." Another object of the invention is to create a simple photoelectric circuit which can be adjusted to be insensitive to small amounts of stray electromagnetic radiation and which adjustment may be made using the light beam source as the adjustment indicator.

The invention and its method and characteristics of operation will now be described.

The drawing is the schematic diagram of a typical circuit which embodies the novel characteristics of the invention.

An A.C. power source of reasonably constant voltage is connected to points 0 and 1. The source of the light beam is represented by 2. The operating resistance of light source 2 and the resistance of resistor 3 are determined by the input A.C. voltage and the required power of the relay 4 such that when the silicon controlled rectifier (here referred to as SCR) 5 is not conducting in its forward conduction direction, the relay 4 receives the proper amount of power to operate. The relay 4 is the means by which some device is controlled by this photoelectric circuit. The diode 6 prevents current from flowing through the resistor 3, the light source 2, and the relay 4 when the A.C. voltage builds up in the direction opposite to the forward conduction direction of the SCR. In operation, the light beam from source 2 is allowed to shine on the sensitive photoresistor 7. Rheostat 8 is then adjusted by starting at zero resistance and increasing its resistance until the SCR 5 begins to conduct on each forward voltage half-cycle. This condition of adjustment will be accompanied by a slight brightening of the light source 2. Should the beam now be interrupted, the light source 2 will dim and at the same time the relay 4 will be energized. This dimming of the light source when the beam is interrupted underlies several of the novel characteristics of this invention. In order to test for beam alignment and stray light sensitivity, it is only necessary to block the light beam. If the light source 2 does not dim, then there is too much stray light, and it is only necessary to decrease the resistance of rheostat 8 until the source dims. When the light beam is unblocked, the light source 2 will increase in intensity if the beam is aligned to shine on the photoresistor 7. If the light source does not increase its intensity, it is only necessary to align the beam. After the initial alignment and stray light adjustments on any such photoelectric circuit in a particular installation, further checks of alignment, background light, and circuit operation may be made easily and instantaneously using only the light source 2 as a test "instrument" by simply blocking the beam and observing the effect upon the intensity of the light source.

Another novelty of the invention is that the relay 4 will not be energized if the light source 2 fails. That this is true follows from the fact that all current which passes through the relay 4 must also pass through the light source 2. Thus, the invention is self-protected against operation of any controlled device if the light source fails.

Still another novelty of the invention is that a wide variety of types of relay 4 may be used. Thermal and A.C. relays may be connected directly into the circuit providing that the light source 2 and the resistor 3 have been correctly chosen to supply the correct power to relay 4 as previously described. D.C. relays may also be used providing that a large filter capacitor is connected across the coil terminals.

For example, a typical circuit to operate a 6 volt thermal or A.C. relay with a 115 VAC power source could consist of a 75 watt light source 2, a 100 ohm resistor 3, a 1 ampere, 150 volt peak inverse voltage diode 6, and a 1 ampere, 150 volt peak inverse voltage SCR 5. The type and resistance of the photoresistor 7 would be determined by the type of radiation to be detected and the particular application of the circuit, and the resistance of the rheostat would be determined by the type of photoresistor 7.

I have described the general and specific features of my invention, as well as a specific circuit. However, it will be apparent to persons skilled in the art that certain modifications may be made that would nevertheless fall within the scope of the invention. For example, the SCR and diode could be removed, a short circuit placed across the position of the diode, and a TRIAC or other bilateral controlled switching device placed in the position of the SCR. Also, the SCR could be replaced by some other type of unilateral switching device. Also, by series and/or parallel connection more than one relay could be connected in the position of relay 4. Also, relay 4 could be replaced by some other type of loading device to obtain direct control of the loading device without an intervening relay. Also, certain rearrangements of the circuit positions of the elements in the circuit are possible. Such modifications as these could be made without changing the fundamental characteristics and novelties set forth in the following claim.

What I claim is:

1. A photoelectric control circuit to operate on A.C. power that comprises a diode rectifier, a silicon controlled rectifier, a photoresistor, a rheostat, a resistor, a source of electromagnetic radiation to which the photoresistor is sensitive, and a relay, so connected that the silicon controlled rectifier is parallel with the resistor and the relay, and that the power from the A.C. source must pass consecutively through the diode rectifier, through the silicon controlled rectifier if it is conducting or through the resistor and relay if the silicon controlled rectifier is not conducting, and finally through the source of electromagnetic radiation, and with the photoresistor connected to the anode and gate of the silicon controlled rectifier and the rheostat connected to the gate and cathode of the silicon controlled rectifier; and such a circuit having the novel characteristics that the relay or relays will not be energized should the light source fail, that different types of electromagnetic and thermal relays may be used, that the circuit may be adjusted to operate in the presence of stray background light using the intensity of the electromagnetic radiation source as an indicator of the correct adjustment, and that it may be checked for beam alignment and circuit operation by merely interrupting the beam and observing the effect on the intensity of the light source.

* * * * *